(12) United States Patent
Wang et al.

(10) Patent No.: US 9,909,019 B2
(45) Date of Patent: Mar. 6, 2018

(54) DIFFUSION COATINGS FOR METAL-BASED SUBSTRATE AND METHODS OF PREPARATION THEREOF

(71) Applicant: GENERAL ELECTRIC COMPANY, Schenectady, NY (US)

(72) Inventors: Limin Wang, Clifton Park, NY (US); Lawrence Bernard Kool, Clifton Park, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/749,096

(22) Filed: Jun. 24, 2015

(65) Prior Publication Data
US 2016/0376693 A1 Dec. 29, 2016

(51) Int. Cl.
*C23C 10/32* (2006.01)
*C09D 7/12* (2006.01)
*C23C 10/02* (2006.01)
*C23C 10/58* (2006.01)

(52) U.S. Cl.
CPC .......... *C09D 7/1216* (2013.01); *C23C 10/02* (2013.01); *C23C 10/32* (2013.01); *C23C 10/58* (2013.01)

(58) Field of Classification Search
CPC ................................. C23C 10/30; C23C 10/32
See application file for complete search history.

(56) References Cited

U.S. PATENT DOCUMENTS

| 2,685,543 | A |   | 8/1954  | Sindeband |
|-----------|---|---|---------|-----------|
| 2,885,301 | A | * | 5/1959  | Samuel .................... C23C 10/32 427/376.4 |
| 2,927,043 | A | * | 3/1960  | Stetson ................... C23C 24/106 106/1.12 |
| 3,741,791 | A |   | 6/1973  | Maxwell et al. |
| 3,785,854 | A | * | 1/1974  | Baldi ...................... C23C 10/60 148/264 |
| 3,867,266 | A |   | 2/1975  | Miyata et al. |
| 4,904,501 | A | * | 2/1990  | Davis ...................... C23C 10/60 427/253 |
| 6,110,262 | A | * | 8/2000  | Kircher .................. C23C 10/26 106/14.21 |
| 8,124,246 | B2 |  | 2/2012  | Tolpygo |
| 8,124,426 | B2 |  | 2/2012  | Gaidis |
| 8,262,812 | B2 |  | 9/2012  | Helmick et al. |
| 2005/0014010 | A1 |  | 1/2005 | Dumm et al. |
| 2008/0096045 | A1 | * | 4/2008 | Fairbourn ............... C23C 18/04 428/641 |
| 2008/0245445 | A1 | * | 10/2008 | Helmick ................. C23C 10/26 148/268 |
| 2010/0151125 | A1 |  | 6/2010 | Kool et al. |
| 2011/0058951 | A1 |  | 3/2011 | Walter et al. |
| 2011/0058952 | A1 |  | 3/2011 | Pillhoefer et al. |
| 2012/0060721 | A1 |  | 3/2012 | Kool et al. |
| 2013/0004712 | A1 |  | 1/2013 | Belov |
| 2014/0044938 | A1 |  | 2/2014 | Pillhoefer et al. |
| 2014/0044986 | A1 |  | 2/2014 | Pillhoefer et al. |

OTHER PUBLICATIONS

Segio Lupo "Fundamentals of Electroheat; Electrical Technologies for Process Heating" Springer (c) 2017 p. 223.*
G.W. Goward; "Progress in coatings for gas turbine airfoils," Surface and Coatings Technology, Oct. 10, 1998, vols. 108-109, pp. 73-79.
Zhu, et al.; "Oxidation of a Novel Chromium Coating with CeO2 Dispersions," Oxidation of Metals, Dec. 2004, vol. 62, Issue 5-6, pp. 411-426.
Cao, et al.; "A Novel Duplex Low-temperature Chromizing Process at 500 degrees C," J. Mater Sci. Technol., vol. 23, No. 6, 2007, pp. 823-827.
Cao, et al.; Phase transformations in low-temperature chromized 0.45 wt. per cent C plain carbon steel, Surface and Coatings Technology, vol. 201, 2007, pp. 7970-7977.
Sikalidis, ed., Advances in Ceramics—Synthesis and Characterization, Processing and Specific Applications, Chapter 4 by Kimura entitled "Molten Salt Synthesis of Ceramic Powders", Aug. 2011, pp. 75-100.
Leferink, et al.; "Chromium Diffusion Coatings on Low-Alloyed Steels for Corrosion Protection Under Sulphidizing Conditions," VGB Kraftwerkstechnik, vol. 73, No. 3, 1993, pp. 1-14.
Kool, et al.; "Chromide Coatings, Articles Coated with Chromide Coatings, and Processes for Forming Chromide Coatings," filed Dec. 30, 2014 as U.S. Appl. No. 14/585,890 (not yet published).

* cited by examiner

Primary Examiner — Nathan Empie
(74) Attorney, Agent, or Firm — Nitin N. Joshi

(57) ABSTRACT

The present invention is directed to coating compositions for forming diffusion coatings on metal-based substrates. The coating compositions may include a metal powder, an inorganic salt, an activator, and a binder. The present invention is also directed to processes for forming diffusion coatings on metal-based substrates using the disclosed coating compositions.

14 Claims, No Drawings

DIFFUSION COATINGS FOR METAL-BASED SUBSTRATE AND METHODS OF PREPARATION THEREOF

FIELD OF THE INVENTION

This invention relates to coating compositions for forming diffusion coatings on metal-based substrates. This invention also relates to processes for forming diffusion coatings on metal-based substrates. Such coating compositions and processes are useful for preparation of diffusion coatings to protect metal-based surfaces from various types of damage, such as oxidation, erosion, and corrosion.

BACKGROUND OF THE INVENTION

Chromium coatings on components of turbine engines are used to protect component surfaces from oxidation, erosion, and corrosion attack along the hot gas path during gas turbine operation. Conventional chromium diffusion layer formation methods involve the use of chromium pack cementation processes, which are described, for example, in Leferink et al., Chromium Diffusion Coatings on Low-Alloyed Steels for Corrosion Protection Under Sulphidizing Conditions, *VGB Kraftwerkstechnik*, 73:3, 1-14 (1993). On an industrial scale, the pack cementation process is carried out by placing entire objects to be coated in a pack, which is a fine powder mixture. The pack consists of an inert filler, which is usually $Al_2O_3$, an activator, which is usually $NH_4Cl$ or other halides, and chromium powder. A metal powder other than chromium powder may be used if the desired diffusion coating is not a chromium diffusion coating. For example, aluminum powder may be used to form an aluminum diffusion coating or silicon powder may be used to form a silicon diffusion coating. The pack, together with the object to be coated, is then heated, usually in an inert or reducing atmosphere. This heat treatment step is usually performed at about 800 to about 1100° C. for about 4-24 hours and it creates a diffusion coating of about 10-80 μm thickness on a suitable metal-based surface.

During heating of the pack, the activator is cracked according to the following example reaction, wherein the metal powder is a chromium powder and the activator is $NH_4Cl$ and wherein "s" stands for "solid" and "g" stands for "gas":

$$NH_4Cl(s) \rightarrow NH_4Cl(g) \rightarrow NH_3(g) + HCl(g) \quad (1)$$

$$2NH_3(g) \rightarrow N_2(g) + 3H_2(g) \quad (2)$$

The hydrochloric acid that is formed then reacts with chromium, mainly in the following reaction:

$$2HCl(g) + Cr(s) \rightarrow CrCl_2(g) + H_2(g) \quad (3)$$

Additionally, a small amount of $CrCl_3$ is formed. The partial pressures of the chromium chlorides (i.e., $CrCl_2$ and $CrCl_3$, jointly referred to as $CrCl_x$) are high enough to partially transfer via a gas phase to the metal-based surface when heated at approximately 1100° C. At the metal-based surface, the $CrCl_x$ are converted in the reducing environment into metallic Cr and gaseous hydrochloric acid, as shown below:

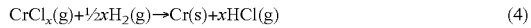

$$CrCl_x(g) + \tfrac{1}{2}xH_2(g) \rightarrow Cr(s) + xHCl(g) \quad (4)$$

The gaseous hydrochloric acid then comes into contact with the Cr powder, where it reacts again and is converted to $CrCl_x$ as shown in reaction 3 above. Thus, the activator is a necessary ingredient in a diffusion coating preparation process. The use of the activator leads to the formation of substantial amounts of gaseous hydrogen halides in the conventional pack cementation process.

There are numerous disadvantages to the conventional pack cementation process. The use of a large amount of activator results in a formation of large amounts of gaseous hydrogen halides, which are intermediate products of the process as discussed above. These hydrogen halides can attack and damage surface coating layers, such as PtAl layer, during coating or repair processes. The hydrogen halides, together with metal halides gaseous phases may also cause the formation of diffusion coatings on surfaces where one would not want to form diffusion coating. Moreover, the generation of hydrogen halide gases can cause environmental health and safety issues.

There are also other disadvantages to the conventional pack cementation process. There is an elevated cost due to a need to use large amounts of a metal powder, an activator, and a filler to create the pack. The pack cementation process also requires use of masking tools and materials, which further add to the cost. Another factor that increases the cost of the pack cementation process is that its heat treatment step requires use of very high temperatures, typically at around 1100° C. Accordingly, an improvement over the conventional pack cementation process is desired.

SUMMARY OF THE INVENTION

Embodiments of the present invention overcome the above-discussed problems associated with the conventional pack cementation process.

In one embodiment, a coating composition for forming a diffusion coating on a metal-based substrate comprises: a metal powder; an inorganic salt having a melting point that is less than or equal to about 800° C.; an activator; and a binder.

Other embodiments include the use of the above described coating compositions in processes for forming a diffusion coating on a metal-based substrate. One such process comprises:

(a) applying a coating composition onto the metal-based substrate to form a coating layer on the metal-based substrate, the coating composition comprising a metal powder, an inorganic salt having a melting point that is less than or equal to about 800° C., an activator, and a binder;

(b) drying the coating layer; and (c) heat treating the coating layer and the metal-based substrate at a sufficient temperature and for a sufficient period of time to form the diffusion coating on the metal-based substrate;

wherein the sufficient temperature is equal to, or is greater than, the melting point of the inorganic salt.

In another embodiment, a process for forming a diffusion coating on a metal-based substrate comprises:

(a) applying a first coating composition onto the metal-based substrate to form a first coating layer on the metal-based substrate, the first coating composition comprising a metal powder, an activator, and a first binder;

(b) applying a second coating composition onto the first coating layer formed in step (a) to form a second coating layer on the first coating layer, the second coating composition comprising an inorganic salt and a second binder, wherein the inorganic salt has a melting point that is less than or equal to about 800° C.; and (c) heat treating the first coating layer, the second coating layer, and the metal-based substrate at a sufficient temperature and for a sufficient period of time to form the diffusion coating on the metal-based substrate; wherein the sufficient temperature is equal to, or is greater than, the melting point of the inorganic salt; and wherein the first coating layer and the second coating layer are dried subsequently to the applying of the second coating composition step (b) and prior to the heat treating step (c); or wherein the first coating layer is dried prior to the applying of the second coating composition step (b) and the second coating layer is dried prior to the heat treating step (c).

Advantageously, processes in accordance with the embodiments of the present invention increase the versatility of the diffusion coating process by creating a diffusion coating only on the desired surfaces. These processes further increase the versatility of the diffusion coating process by preventing damage to any surfaces not intended for diffusion coating without the need to protect such surfaces. Additionally, processes provided herein, as compared to the conventional pack cementation process, utilize significantly smaller quantities of the activator, thus reducing the amount of the generated gaseous hydrogen halides.

An important advantage of these new processes lies in the incorporation of the inorganic salt. The inorganic salt melts during the heat treating step and becomes a molten salt. The molten salt aids in the formation of the diffusion coating and, significantly, at a relatively low temperature range of about 800° C. to about 950° C. The conventional pack cementation process requires higher temperatures, typically at around 1100° C. The higher temperatures of the conventional pack cementation process may adversely affect critical mechanical properties of the materials of the article that is being coated. Accordingly, it is advantageous to form diffusion coatings at lower temperatures.

The molten salt also acts as a barrier and at least partially prevents gaseous hydrogen halides from escaping and causing formation of diffusion coating on surfaces where such coating is not desired. By at least partially preventing emission of gaseous hydrogen halides, the molten salt also shields surfaces that could be damaged by the gaseous hydrogen halides. Thus, there is no longer a need for masking of the surfaces that require protection from gaseous hydrogen halides. The molten salt also acts as a liquid barrier to prevent oxygen contamination from the outside atmosphere. Additionally, the reduction in generated hydrogen halide gases is desirable with respect to environmental health and safety issues.

Furthermore, the coating compositions and the coating processes described herein significantly reduce costs when compared to the conventional pack cementation process. For example, there is a substantial reduction in the amounts of necessary ingredients because relatively small amounts of ingredients are required to form either the coating layer or the combination of the first coating layer and the second coating layer. Thus, the processes require smaller amounts of the metal powder, such as chromium powder, and, as discussed above, smaller amounts of the activator than are required by conventional pack cementation. Furthermore, a filler is not required for the processes provided herein. As discussed above, masking is also no longer required. Another advantageous feature of the processes described herein is that they require lower heat treating step temperatures than conventional processes. Therefore, processes performed in accordance with embodiments described herein greatly reduce the costs and labor associated with the conventional pack cementation process.

The processes described herein also produce coatings with desirable properties. The use of the molten salt aids in the formation of the diffusion coating. The molten salt also acts as a liquid barrier to prevent oxygen contamination from the outside atmosphere. Significantly, the diffusion coatings prepared by the processes described herein may have a desirable microstructure. For example, the diffusion coating may comprise greater than or equal to about 45% by weight of the element of the metal powder, such as chromium. In other embodiments, the diffusion coating may comprise greater than or equal to about 15%, 20%, 25%, 30%, 35%, 40%, 45%, 50%, 55%, 60%, 65%, or 70% by weight of the element of the metal powder.

The above-described novel and advantageous features of coating compositions and coating processes in accordance with embodiments of the present invention overcome shortcomings of the conventional pack cementation process while producing diffusion coatings with desirable properties.

DETAILED DESCRIPTION OF THE INVENTION

In the following specification and the claims which follow, reference will be made to a number of terms, which shall be defined to have the following meanings.

The singular forms "a", "an", and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about", is not to be limited to the precise value specified. In some instances, the approximating language may correspond to the precision of an instrument for measuring the value.

As used herein, the term "mil" refers to a measurement unit of length wherein 1 mil equals to a thousandth of an inch, i.e., 0.001 inches. Thus, 1 mil also equals to 25.40 µm.

As explained below, the term "inorganic salt", as used herein, may refer to a single inorganic salt, to a binary mixture of two inorganic salts, or to a ternary mixture of three inorganic salts.

As used herein, the term "diffusion coating" refers to a surface coating in which an element of the metal powder of a coating composition (or of the first coating composition), together with elements of any additives present in the metal powder, is diffused into the metal-based substrate. The diffusion coating may have a thickness of about 0.0001 to about 0.003 inches. The diffusion coating may comprise greater than or equal to about 15%, 20%, 25%, 30%, 35%, 40%, 45%, 50%, 55%, 60%, 65%, or 70% by weight of the element of the metal powder, such as chromium.

As used herein, the term "metal-based substrate" refers to metallic or cermet materials. For example, the metal-based substrate includes superalloys, carbon steel, stainless steel, titanium-based alloys and composition materials with ceramic and metallic components. In one particular embodiment, the metal-based substrate is a nickel based superalloy.

As used herein, the term "alpha-chromium" refers to a microstructure with a chromium-rich body-centered cubic (BCC) phase in which chromium is mixed with the elements of the metal-based substrate. The alpha-chromium phase may also contain additives, such as aluminum, cobalt, nickel, silicon, and mixtures thereof. The alpha-chromium is present when the chromium concentration in the diffusion coating is equal to or greater than about 45% by weight.

The present invention relates to coating compositions for forming a diffusion coating on a metal-based substrate. In one embodiment, the invention is directed to a coating composition for forming a diffusion coating on a metal-based substrate, the coating composition comprising: a metal powder; an inorganic salt having a melting point that is less than or equal to about 800° C.; an activator; and a binder. In one embodiment, the metal powder is selected from the group consisting of a chromium powder, aluminum powder, and mixtures thereof. Accordingly, in one embodiment, the metal powder is aluminum powder. In another embodiment, the metal powder is a mixture of aluminum powder and chromium powder. In one particular embodiment, the metal powder is chromium powder.

In a certain embodiment the metal powder particles have mean diameter of about 1 to about 10 microns (i.e., micrometers ($\mu m$)) as measured using a conventional particle size analyzer. The purity of the metal powder, in some embodiments, is at least about 95% by weight, and is at least about 99% by weight in particular embodiments. In one illustrative embodiment, the metal powder is a chromium powder.

The metal powder may further comprise an additive such as aluminum, cobalt, nickel, silicon, or mixtures thereof. If the metal powder is aluminum, then the additive may be cobalt, nickel, silicon, or mixtures thereof.

In one embodiment, the inorganic salt is selected from any single inorganic salt with a melting point that is less than or equal to about 800° C. For example, the single inorganic salt may be KCl, LiF, LiCl, $CaCl_2$, $MgCl_2$, KOH, or mixtures thereof.

In another embodiment, the inorganic salt is a binary mixture of two inorganic salts. Typically, the salts in the binary mixture are in a well-mixed solid powder form. Such binary mixtures of two inorganic salts may be selected, for example, from the group consisting of KCl—$BaCl_2$, NaCl—KCl, NaCl—$CaCl_2$, NaCl—$BaCl_2$, NaCl—$MgCl_2$, $MgCl_2$—$BaCl_2$, $MgCl_2$—$CaCl_2$, NaCl—$Na_2CO_3$, and mixtures thereof. The binary mixtures may have various molar ratios of the component salts. In one embodiment, the salt is KCl—$BaCl_2$ in 0.555:0.445 molar ratio. In another embodiment, the salt is NaCl—$BaCl_2$ in 0.6:0.4 molar ratio. The molar ratio of the salts in a binary mixture affects the melting point of the binary mixture. Accordingly, by controlling the molar ratio of the binary mixture, one having ordinary skill in the art can select a melting point of the binary mixture that is less than or equal to about 800° C.

The inorganic salt may also be a ternary mixture of three inorganic salts. Typically, the salts in the ternary mixture are in a well-mixed solid powder form. For example, the ternary mixture of three inorganic salts may be selected from the group consisting of LiF—NaF—$MgF_2$, LiCl—KCl—$CaCl_2$, LiF—$PuF_3$—$ThF_4$, and mixtures thereof. The ternary mixtures may have various molar ratios of the component salts. As with the binary mixtures, the molar ratio of the salts in a ternary mixture affects the melting point of the ternary mixture. Accordingly, by controlling the molar ratio of the ternary mixture, one having ordinary skill in the art can select a melting point of the ternary mixture that is less than or equal to about 800° C.

The activator may be selected from the group consisting of ammonium halides, chromium halides, aluminum halides, and mixtures thereof. For example, the activator may be selected from the group consisting of $NH_4Cl$, $NH_4F$, $NH_4Br$, $CrCl_2$, $CrCl_3$, $AlCl_3$, and mixtures thereof.

The binders are well known in the art and a binder suitable for use in the compositions described herein may be any binder which promotes cohesiveness of the coating composition and which decomposes when exposed to a sufficient temperature discussed below, which is a temperature of about 600° C. to about 1300° C. or a temperature of about 800° C. to about 950° C. The binder also allows the coating compositions to have physical properties of a paste or a viscous liquid at room temperature. The binder may comprise one component or a combination of components. For example, the binder may be selected from the group consisting of waterborne acrylic resin based binders, organofunctional silane based binders, cellulose-derived water-soluble polymer based binders, polyvinyl alcohol based binders, epoxy resin based binders, alcohol soluble resin based binders, and mixtures thereof. In one specific embodiment, the binder may be "BINDER B-200", which is commercially available from APV Engineered Coatings.

The present invention includes a coating composition wherein: the metal powder is present in an amount of about 1% to about 60% by weight of the coating composition; the inorganic salt is present in an amount of about 1% to about 70% by weight of the coating composition; the activator is present in an amount of about 1% to about 30% by weight of the coating composition; and the binder is present in the amount of at least about 1% by weight of the coating composition.

In one embodiment, the invention is directed to a coating composition for forming a chromium diffusion coating on a metal-based substrate, the coating composition comprising: a chromium powder; a binary mixture of two inorganic salts selected from the group consisting of KCl—$BaCl_2$, NaCl—KCl, NaCl—$CaCl_2$, NaCl—$BaCl_2$, NaCl—$MgCl_2$, $MgCl_2$—$BaCl_2$, $MgCl_2$—$CaCl_2$, NaCl—$Na_2CO_3$, and mixtures thereof, wherein the binary mixture of two inorganic salts has a melting point that is less than or equal to about 800° C.; an activator selected from the group consisting of $NH_4Cl$, $NH_4F$, $NH_4Br$, $CrCl_2$, $CrCl_3$, $AlCl_3$, and mixtures thereof; and a binder. In one embodiment, the binary mixture of two inorganic salts is KCl—$BaCl_2$ and the activator is $NH_4Cl$. In another embodiment, the binary mixture of two inorganic salts is NaCl—$BaCl_2$ and the activator is $NH_4Cl$. In one embodiment, the chromium powder further comprises an additive selected from the group consisting of aluminum, cobalt, nickel, silicon, and mixtures thereof. In these embodiments, the binder may be selected from the group consisting of waterborne acrylic resin based binders, organofunctional silane based binders, cellulose-derived water-soluble polymer based binders, polyvinyl alcohol based binders, epoxy resin based binders, alcohol soluble resin based binders, and mixtures thereof. Furthermore, in these embodiments, the chromium powder may be present in an amount of about 1% to about 60% by weight of the coating composition, the binary mixture of two inorganic salts may be present in an amount of about 1% to about 70% by weight of the coating composition the activator may be present in an amount of about 1% to about 30% by weight of the coating composition, and the binder may be present in the amount of at least about 1% by weight of the coating composition.

The present invention is also directed to use of the above described coating compositions in processes for forming a diffusion coating on a metal-based substrate. One such process comprises:

(a) applying a coating composition onto the metal-based substrate to form a coating layer on the metal-based substrate, the coating composition comprising a metal powder, an inorganic salt having a melting point that is less than or equal to about 800° C., an activator, and a binder;

(b) drying the coating layer; and (c) heat treating the coating layer and the metal-based substrate at a sufficient temperature and for a sufficient period of time to form the diffusion coating on the metal-based substrate;

wherein the sufficient temperature is equal to, or is greater than, the melting point of the inorganic salt.

The coating composition may be a paste or a viscous liquid when applied to the metal-based substrate in step (a). Application of the coating composition may be done by painting the coating composition onto the metal-based substrate. Another method of applying the coating composition may involve dipping the metal-based substrate into the coating composition. Thus it is easy to apply the coating composition only to those surfaces of the metal-based based substrate where one desires to create a diffusion coating. One simply would not apply the coating composition to any surfaces on the article where formation of the diffusion coating is not desired, which advantageously eliminates the need for masking.

The coating layer, prior to the drying step and the heat treating step, may have a thickness of about 0.004 to about 0.197 inches. The use of such relatively thin coating layer significantly reduces the required amount of consumed ingredients as compared with conventional pack cementation process.

The drying step, intended to remove volatile components, may be performed by air drying the coating layer. Such air drying at room temperature may last for about 2 to about 4 hours. The drying step may also be performed by heating the coating layer. Such drying by heating may be done, for example, by heating the coating layer to 50° C. for about 1 to about 3 hours. When the drying step is performed by heating the coating layer, the drying step may be performed in a furnace and the same furnace may then be used in the heat treating step, without a need to remove the article from the furnace between the drying step and the heat treating step. Alternatively, one furnace may be used for the drying step and a different furnace may be used for the heat treating step.

In one embodiment the heat treating step (c) is performed in an inert atmosphere, for example, Ar, $N_2$, or $H_2$. The sufficient temperature is a temperature of about 600° C. to about 1300° C. In another embodiment, the sufficient temperature is a temperature of about 800° C. to about 950° C. The sufficient period of time may be about 1 to about 48 hours. Thus, the heat treating step (c) may start with a gradual increase in temperature until the sufficient temperature is reached. Once the desired sufficient temperature is reached, it is maintained for a time period of about 1 to about 48 hours. During this time period, the coating layer becomes a less viscous slurry which "soaks" into the metal-based substrate, thus creating a diffusion coating. It may be desirable to place a holder or a mold over the coating layer prior to the heat treatment step. This will prevent the slurry from coming into contact with surfaces not intended for diffusion coating.

The most convenient mode of performing the heat treating step would be to subject the entire article being coated to heat treatment, even if only some surfaces of the article are covered with the coating layer, because only the covered surfaces are intended to have diffusion coating.

Subsequently to the heat treating step (c), one may cool the diffusion coating on the metal-based substrate to room temperature in a cooling step (d). After the cooling step (d), it may be desirable to clean the diffusion coating on the metal-based substrate. Such cleaning may be done by soaking the diffusion coating in water or by ultrasonic cleaning.

The diffusion coating will have a thickness of about 0.0001 to about 0.003 inches. This diffusion coating will be enriched with the metal from the metal powder of the coating composition. In one embodiment the metal powder is a chromium powder and the diffusion coating has a microstructure comprising greater than or equal to about 45% by weight of chromium. In other embodiments, the diffusion coating may comprise greater than or equal to about 15%, 20%, 25%, 30%, 35%, 40%, 45%, 50%, 55%, 60%, 65%, or 70% by weight of chromium. The thickness of the diffusion coating may be measured by various methods, for example, by using a Scanning Electron Microscope. The weight percent concentration of chromium or of another diffused element may be measured by Energy Dispersive X-ray (EDX) or by Wavelength Dispersive Spectroscopy (WDS) methods.

In another embodiment, the present invention is directed to a process for forming a diffusion coating on a metal-based substrate, the process comprising:

(a) applying a first coating composition onto the metal-based substrate to form a first coating layer on the metal-based substrate, the first coating composition comprising a metal powder, an activator, and a first binder;

(b) applying a second coating composition onto the first coating layer formed in step (a) to form a second coating layer on the first coating layer, the second coating composition comprising an inorganic salt and a second binder, wherein the inorganic salt has a melting point that is less than or equal to about 800° C.; and (c) heat treating the first coating layer, the second coating layer, and the metal-based substrate at a sufficient temperature and for a sufficient period of time to form the diffusion coating on the metal-based substrate;

wherein the sufficient temperature is equal to, or is greater than, the melting point of the inorganic salt; and wherein the first coating layer and the second coating layer are dried subsequently to the applying of the second coating composition step (b) and prior to the heat treating step (c); or wherein the first coating layer is dried prior to the applying of the second coating composition step (b) and the second coating layer is dried prior to the heat treating step (c).

The first binder of the first coating composition may or may not be the same as the second binder of the second coating composition. The first binder and the second binder may be selected from the binders described above. Accordingly, the first binder promotes cohesiveness of the first coating composition and decomposes when exposed to the sufficient temperature discussed above. Similarly, the second binder promotes cohesiveness of the second coating composition and decomposes when exposed to the sufficient temperature. The first binder and the second binder allow the first coating composition and the second coating composition, respectively, to have physical properties of a paste or a viscous liquid at room temperature. The first binder and the second binder may each comprise one component or a combination of components. For example, the first binder or the second binder may be selected from the group consisting of waterborne acrylic resin based binders, organofunctional silane based binders, cellulose-derived water-soluble polymer based binders, polyvinyl alcohol based binders, epoxy resin based binders, alcohol soluble resin based binders, and mixtures thereof. In one specific embodiment, the first binder and the second binder may each be "BINDER B-200", which is commercially available from APV Engineered Coatings.

The first coating composition may be a paste or a viscous liquid when applied onto the metal-based substrate in step (a). The second coating composition may also be a paste or a viscous liquid when applied onto the first coating layer in step (b).

In the first coating composition, the metal powder may be present in an amount of about 1% to about 60% by weight of the first coating composition; the activator may be present in an amount of about 1% to about 30% by weight of the first coating composition; and the first binder may be present in the amount of at least about 1% by weight of the first coating composition.

In the second coating composition, the inorganic salt may be present in an amount of about 10 to about 90% by weight of the second coating composition and the second binder may be present in an amount of about 10 to about 90% by weight of the second coating composition.

The first coating layer, prior to the drying step and the heat treating step, may have a thickness of about 0.004 to about 0.197 inches. The second coating layer, prior to the drying step and the heat treating step, may have a thickness of about 0.004 to about 0.197 inches.

Application of the first coating composition may be done by painting the first coating composition onto the metal-based substrate. Another method of applying the first coating composition may involve dipping the metal-based substrate into the first coating composition.

Similarly, application of the second coating composition may be done by painting the second coating composition onto the first coating layer. Another method of applying the second coating composition may involve dipping the first coating layer into the second coating composition.

In one embodiment, the first coating layer is dried prior to the application of the second coating composition onto the first coating layer with subsequent drying of the second coating layer. Alternatively, the first coating layer and the second coating layer are dried together. The drying step or steps may be performed by air drying or by heating, in the same manner as the drying of the coating layer step described above. The heat treating step may also be performed in the same manner as the heat treating step described above. After the heat treating step, the process may include a cooling step as described above. Optionally, the above described cleaning step may also be performed.

In one embodiment, the diffusion coating is an aluminum diffusion coating prepared according to embodiments described above wherein the metal powder of the coating composition or of the first coating composition is an aluminum powder. In another embodiment, the diffusion coating is an aluminum and chromium diffusion coating prepared according to embodiments described above wherein the metal powder of the coating composition or of the first coating composition is a mixture of an aluminum powder and a chromium powder. In one embodiment, the diffusion coating is a chromium diffusion coating prepared according to embodiments described above wherein the metal powder of the coating composition or of the first coating composition is a chromium powder.

This written description uses examples to disclose embodiments of the invention, including the best mode, and also to enable any person skilled in the art to practice the invention, including making and using any devices or systems and performing any incorporated methods. The patentable scope of the invention is not limited to the scope of the provided examples, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXAMPLES

Example 1

Alpha-Chromium Diffusion Coating Process Using One Coating Layer

A surface intended for diffusion coating was prepared by grit blasting to clean up the surface, wherein the surface intended for diffusion coating was on a nickel based superalloy part from a turbine engine. A coating composition paste was formed by mixing 100 grams (g) of inorganic salt (KCl—$BaCl_2$ in 0.555:0.445 molar ratio), 50 g of chromium metal powder (99% purity, about 6 microns size mean diameter as measured by particle size analyzer), 17 g of $NH_4Cl$, and 100 g of BINDER B-200 (commercially available from APV Engineered Coatings). The cleaned surface was coated by painting on the coating composition paste. After air drying for about 3 hours, the part was loaded into a furnace with a hydrogen atmosphere and the temperature in the furnace was ramped up to 950° C. at a rate of 3° C./min and held at that temperature for 5 hours. After soak (i.e, after keeping the part in the furnace at 950° C. for 5 hours), the furnace was allowed to cool at a rate of 3° C./min to room temperature, at which time the part was unloaded from the furnace. Any coating composition paste remaining on the part as a residue was removed by soaking in distilled water. The resultant part had chromium diffusion coating on the intended surface. The diffusion coating had a thickness of approximately 0.0012 inch (i.e, 1.2 mil). The diffusion coating had a microstructure comprising about 40 to about 96% by weight of chromium, with a gradual decrease in the chromium concentration with an increase in the distance from the surface. Underneath the diffusion coating there was a diffusion zone comprising mainly of the nickel based superalloy with low content of diffused chromium.

Example 2

Alpha-Chromium Diffusion Coating Process Using Two Coating Layers

A surface intended for diffusion coating was prepared by grit blasting to clean up the surface, wherein the surface intended for diffusion coating was on a nickel based superalloy part from a turbine engine. A first coating composition paste was formed by mixing 0.5 g of chromium metal powder, 0.17 g of $NH_4Cl$, and 1.0 g of BINDER B-200 (commercially available from APV Engineered Coatings). The cleaned surface was coated by painting on the first coating composition paste to form a first coating layer. A second coating composition paste was formed by mixing 0.5 g of NaCl—$BaCl_2$ (in 0.6:0.4 molar ratio) and 0.5 g of BINDER B-200. The first coating layer was coated by painting onto it the second coating composition paste to form a second coating layer. The first coating layer and the second coating layer were dried together at 50° C. for 1 hour. The part was loaded into a furnace with an inert atmosphere ($H_2$) and the temperature in the furnace was gradually ramped up to 950° C. over a period of 5 hours. The temperature was then held at 950° C. for a period of 5 hours. Then, the temperature was gradually cooled to room temperature over a period of 5 hours. The part was unloaded from the furnace and any coating composition paste remaining on the part as a residue was removed by soaking in distilled water. The resultant part had chromium diffusion coating on the intended surface. The diffusion coating had a thickness of approximately 0.0012 inch (i.e, 1.2 mil). The diffusion coating had a microstructure comprising about 40-96% by weight of chromium, with a gradual decrease in the chromium concentration with an increase in the distance from the surface. Underneath the diffusion coating there was a diffusion zone comprising mainly of the nickel based superalloy with low content of diffused chromium. While only certain features of the invention have been illustrated and described herein, many modifications and changes will occur to those skilled in the art. It is, therefore, to be understood that the appended claims are intended to cover all such modifications and changes as falling within the true spirit of the invention.

Throughout this application, various references are referred to. The disclosures of these publications in their entireties are hereby incorporated by reference as if written herein.

What is claimed is:

1. A process for forming a diffusion coating on a metal-based substrate, the process comprising:
    (a) applying a coating composition onto the metal-based substrate to form a coating layer on the metal-based substrate, the coating composition comprising a metal powder, a ternary mixture of three inorganic salts having a melting point that is less than or equal to 800° C., an activator, and a binder, wherein the ternary mixture is selected from the group consisting of LiF—NaF—$MgF_2$, LiCl—KCl—$CaCl_2$, and LiF—$PuF_3$—$ThF_4$, and wherein the ternary mixture is present in an amount from about 37% to about 70% by weight of the coating composition;
    (b) drying the coating layer; and
    (c) heat treating the coating layer and the metal-based substrate at a temperature in a range from about 800° C. to about 950° C. for a sufficient period of time to melt the the ternary mixture to form a liquid barrier of molten salt, and to form the diffusion coating on the metal-based substrate.

2. The process of claim 1, wherein the coating composition is a paste when applied to the metal-based substrate in step (a).

3. The process of claim 1, wherein the metal-based substrate is a nickel based superalloy.

4. The process of claim 1, wherein the metal powder is selected from the group consisting of a chromium powder, aluminum powder, and mixtures thereof.

5. The process of claim 1, wherein the metal powder further comprises an additive selected from the group consisting of aluminum, cobalt, nickel, silicon, and mixtures thereof.

6. The process of claim 1, wherein the metal powder is present in an amount of about 1% to about 60% by weight of the coating composition, the activator is present in an amount from about 1% to about 30% by weight of the coating composition, and the binder is present in an amount of at least 1% by weight of the coating composition.

7. The process of claim 1, wherein the metal powder is a chromium powder, the diffusion coating has a thickness of about 0.0001 to about 0.003 inches, and wherein the diffusion coating comprises greater than or equal to 45% by weight of chromium.

8. A process for forming a diffusion coating on a metal-based substrate, the process comprising:
    (a) applying a first coating composition onto the metal-based substrate to form a first coating layer on the metal-based substrate, the first coating composition comprising a metal powder, an activator, and a first binder;
    (b) applying a second coating composition onto the first coating layer formed in step (a) to form a second coating layer on the first coating layer, the second coating composition comprising a ternary mixture of three inorganic salts and a second binder, wherein the ternary mixture is selected from the group consisting of LiF—NaF—$MgF_2$, LiCl—KCl—$CaCl_2$, and LiF—$PuF_3$—$ThF_4$ the ternary mixture has a melting point that is less than or equal to 800° C., and the ternary mixture is present in an amount from about 50% to about 90% by weight of the second coating composition; and
    (c) heat treating the first coating layer, the second coating layer, and the metal-based substrate at a temperature in a range from about 800° C. to about 950° C. for a sufficient period of time to melt the ternary mixture to form a liquid barrier of molten salt, and to form the diffusion coating on the metal-based substrate,
    wherein the first coating layer and the second coating layer are dried subsequently to the applying of the second coating composition step (b) and prior to the heat treating step (c), or wherein the first coating layer is dried prior to the applying of the second coating composition step (b) and the second coating layer is dried prior to the heat treating step (c).

9. The process of claim 8, wherein the first coating composition is a paste when applied onto the metal-based substrate in step (a), and wherein the second coating composition is a paste when applied onto the first coating layer in step (b).

10. The process of claim 8, wherein the metal-based substrate is a nickel based superalloy.

11. The process of claim 8, wherein the metal powder is selected from the group consisting of a chromium powder, aluminum powder, and mixtures thereof.

12. The process of claim 8, wherein the metal powder further comprises an additive selected from the group consisting of aluminum, cobalt, nickel, silicon, and mixtures thereof.

13. The process of claim 8, wherein the metal powder is present in an amount of about 1% to about 60% by weight of the first coating composition, the activator is present in an amount of about 1% to about 30% by weight of the first coating composition, and the first binder is present in the amount of at least 1% by weight of the first coating composition.

14. The process of claim 8, wherein the metal powder is a chromium powder, the diffusion coating has a thickness of about 0.0001 to about 0.003 inches, and wherein the diffusion coating comprises greater than or equal to 45% by weight of chromium.

* * * * *